A. L. POWELL.
GRAIN HARVESTER AND BINDER.
APPLICATION FILED FEB. 16, 1911.
1,023,035.
Patented Apr. 9, 1912.
5 SHEETS—SHEET 4.
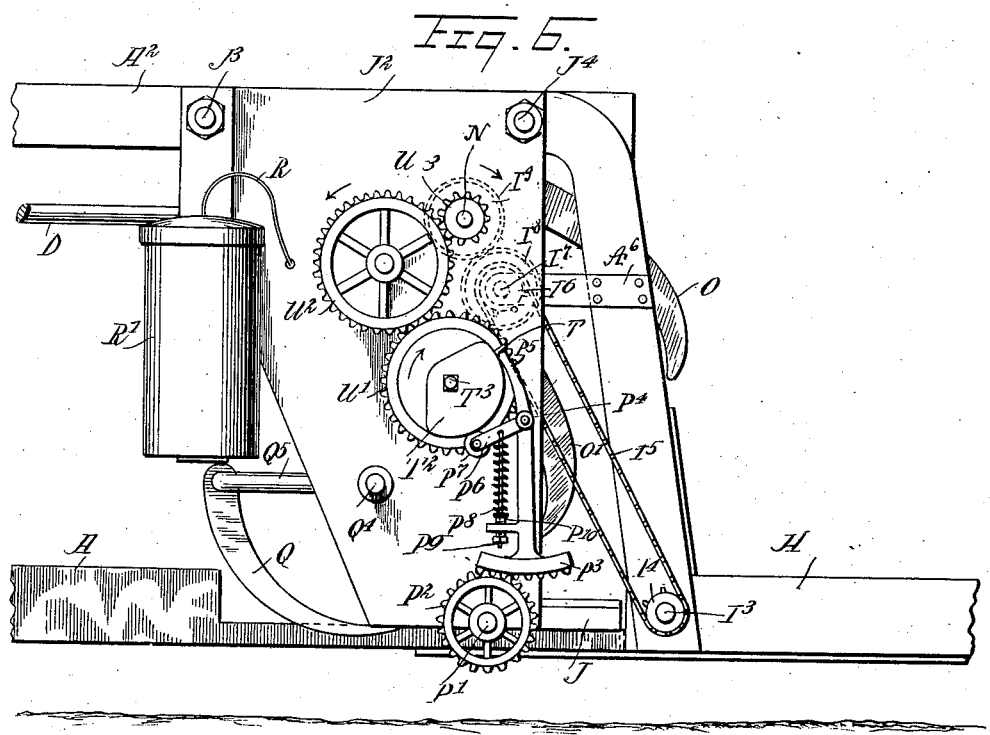
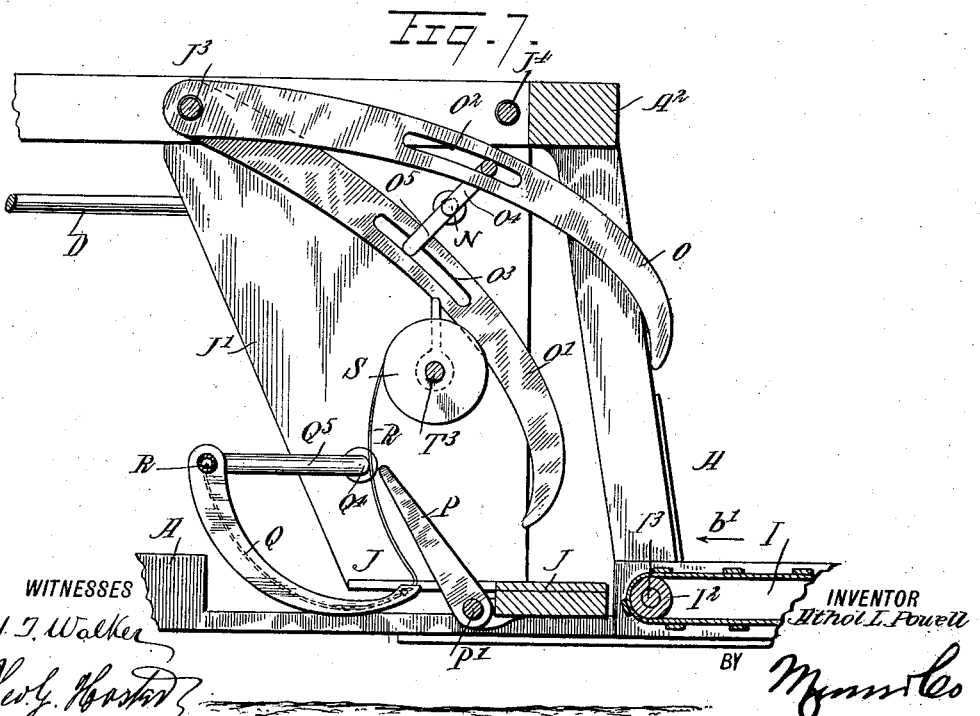

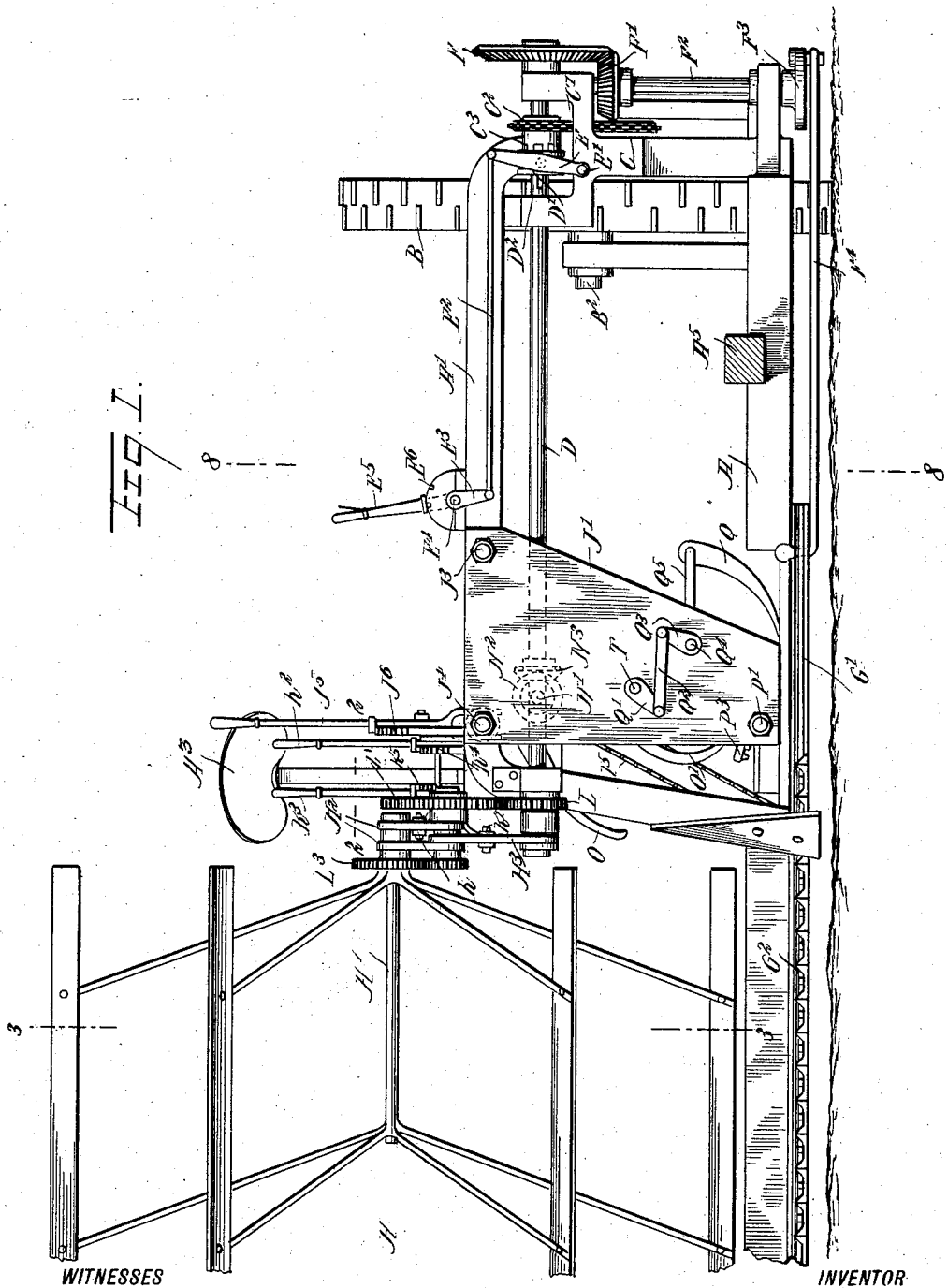

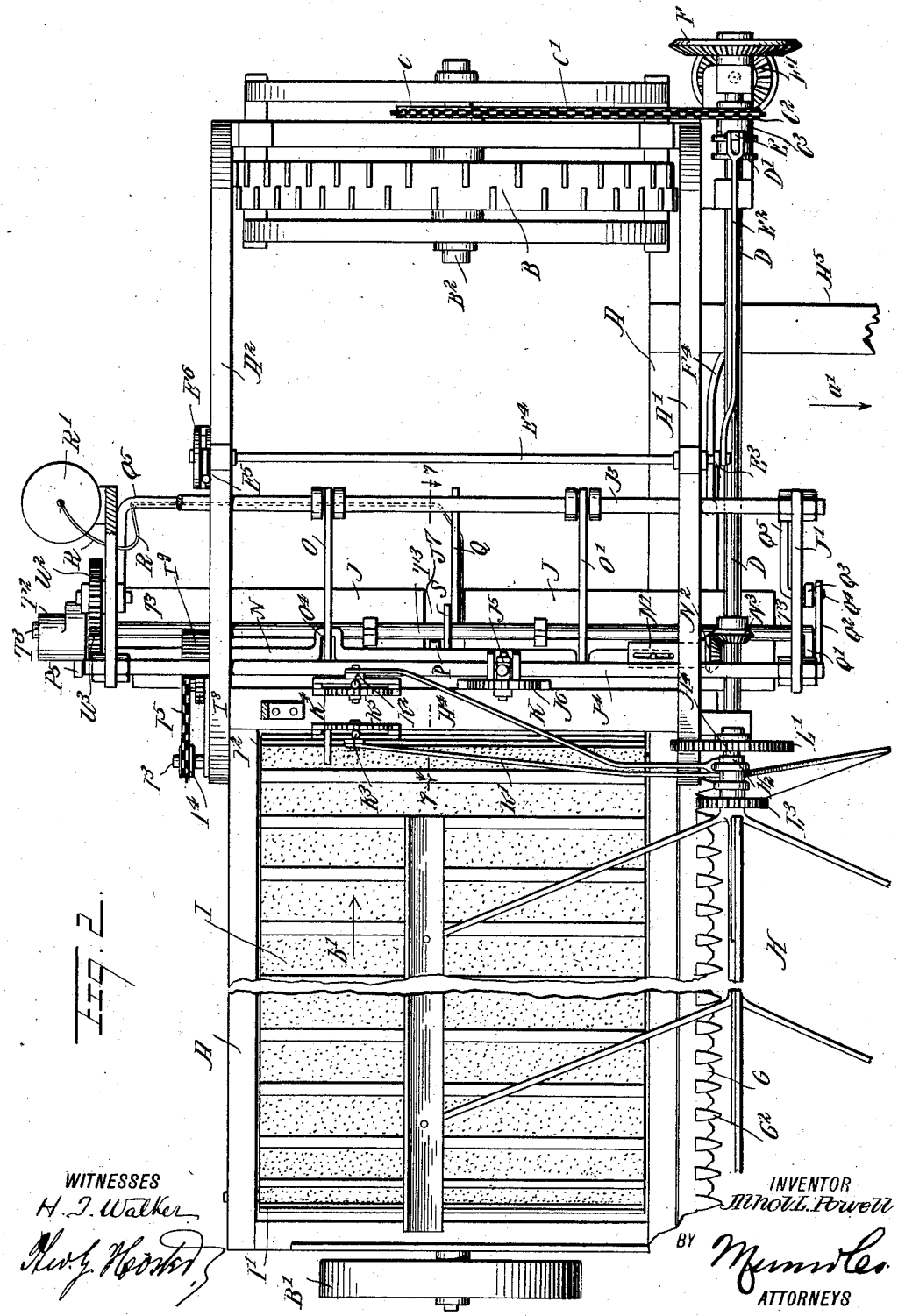

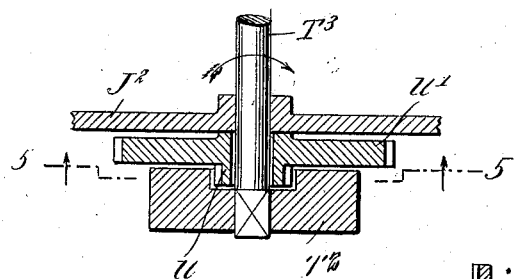
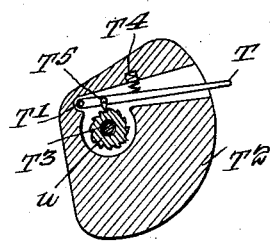
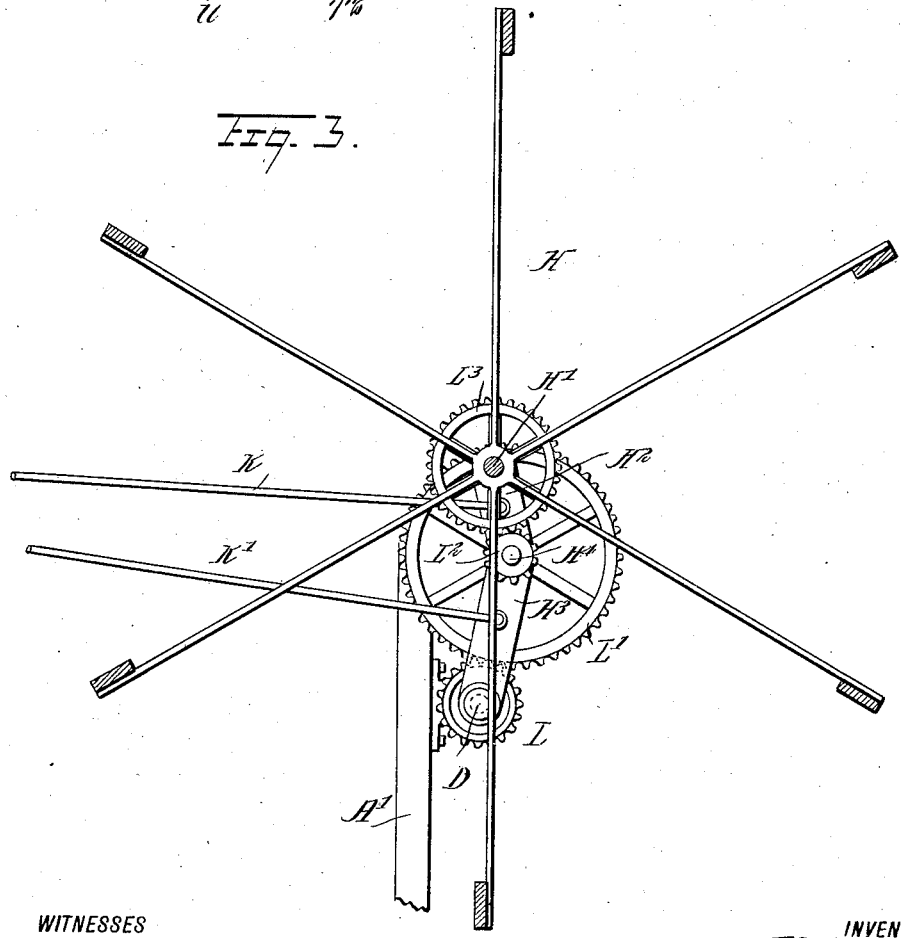

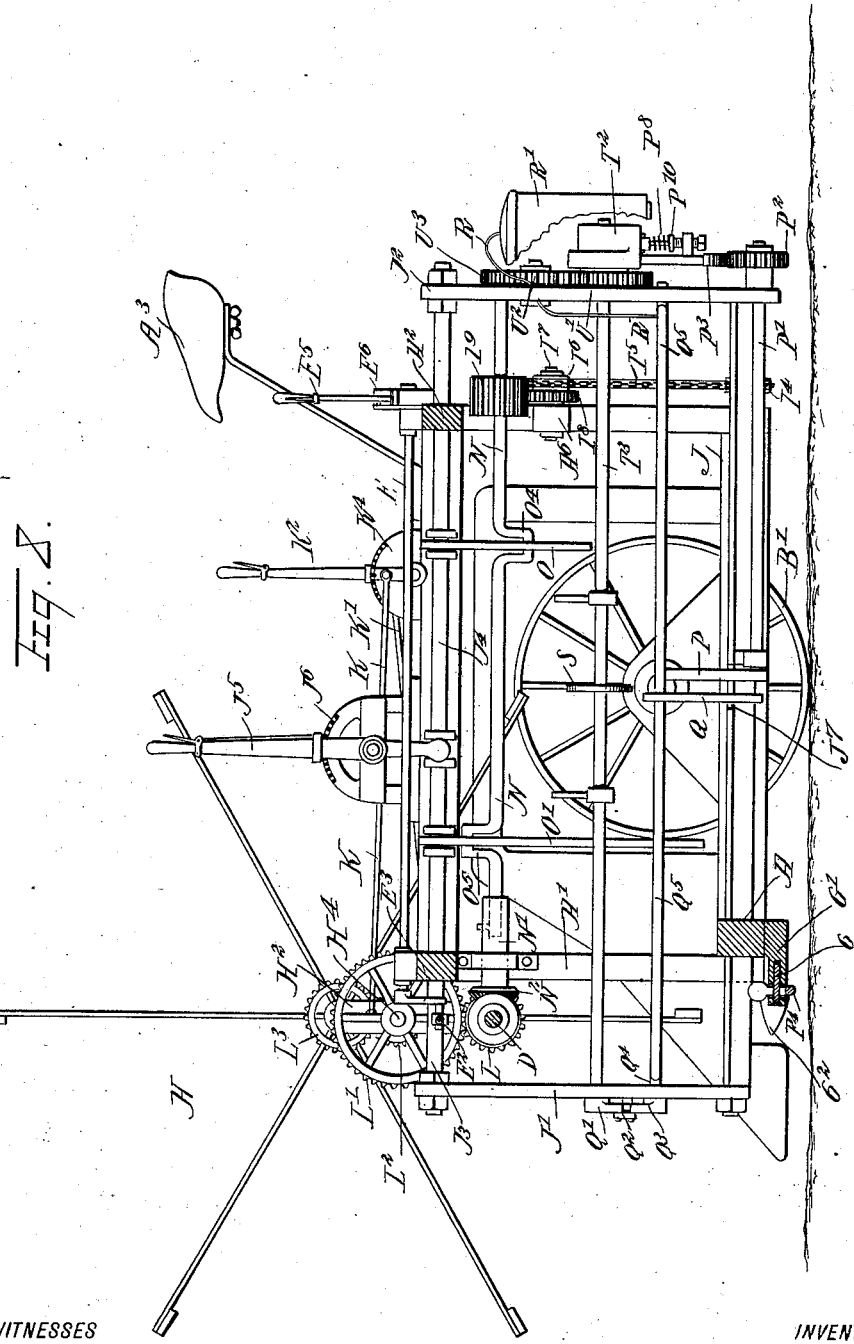

UNITED STATES PATENT OFFICE.

ATHOL LINNWOOD POWELL, OF ALAMO, TENNESSEE.

GRAIN HARVESTER AND BINDER.

1,023,035.  Specification of Letters Patent.  Patented Apr. 9, 1912.

Application filed February 16, 1911. Serial No. 608,886.

*To all whom it may concern:*

Be it known that I, ATHOL L. POWELL, a citizen of the United States, and a resident of Alamo, in the county of Crockett and State of Tennessee, have invented a new and Improved Grain Harvester and Binder, of which the following is a full, clear, and exact description.

The invention relates to harvesters for harvesting wheat and other grain, and its object is to provide a new and improved harvester and binder arranged to insure proper cutting of the grain without undue binding or straining of the cutter or sickle bar, to convey the cut grain on the level from the traveling platform to the binder table, and to bind the grain thereon, to keep the butt ends of the cut grain in alinement, to insure the formation of a smooth sheaf, to permit adjustment of the reel for accommodating and properly binding the short, long or tangled grain, to simplify the machine and reduce the weight thereof, for conveniently drawing the machine over soft and rough ground without requiring undue exertion on the part of the draft animals.

In order to impart a reciprocating motion to the cutter or sickle bar, use is made of a vertically-disposed crank shaft connected by a horizontal pitman with the cutter bar so that the latter is not liable to bind in its bearings. The reel is journaled in a link mounted to swing on another link fulcrumed on the revoluble shaft geared with the reel by a gearing mounted on the links, the latter being connected with manipulating levers under the control of the operator. The grain on the traveling platform is delivered by the same to the binder table, over which operate up and down swinging pushers for forming the grain into a bundle which is then tied by the needle into a sheaf, the needle operating in conjunction with a trip arm and the swinging pushers.

A practical embodiment of the invention is represented in the accompanying drawings forming a part of this specification, in which similar characters of reference indicate corresponding parts in all the views.

Figure 1 is a front elevation of the grain harvester and binder; Fig. 2 is a plan view of the same, parts being in section on the line 2—2 of Fig. 1; Fig. 3 is a cross section of the reel and the gearing for driving the same, the section being on the line 3—3 of Fig. 1; Fig. 4 is an enlarged sectional plan view of part of the mechanism for actuating the trip arm; Fig. 5 is a sectional side elevation of the same on the line 5—5 of Fig. 4; Fig. 6 is an enlarged rear end elevation of the machine and showing more particularly the means for forming the grain into a bundle and binding it; Fig. 7 is a vertical section on line 7—7 of Fig. 2; and Fig. 8 is a sectional side elevation of the grain harvester and binder, the section being on the line 8—8 of Fig. 1.

The framework A of the machine is arranged close to the ground and is supported from the wheels B and B' mounted to travel on the ground, and of which the wheel B is the inner or traction wheel and the wheel B' is the outer supporting wheel. The shaft $B^2$ of the traction wheel B is provided with a sprocket wheel C (see Fig. 2) connected by a sprocket chain C' with a sprocket wheel $C^2$ mounted to rotate loosely on the shaft D, journaled in suitable bearings arranged on a bracket A' attached to the main frame A at the front thereof, the said shaft D extending at the front of the machine, as plainly indicated in Figs. 1 and 2. On the hub of the sprocket wheel $C^2$ is formed or secured a clutch member $C^3$ adapted to be engaged by a clutch member D' mounted to slide on the shaft D and engaging a key $D^2$, so that when the shaft D is rotated a rotary motion is given to the clutch member D', and when the latter is in mesh with the clutch member $C^3$ then the rotary motion given to the sprocket wheel $C^2$ is transmitted by the clutch members $C^3$, D' to the shaft to rotate the latter.

The clutch member D' is under the control of the operator, and for this purpose the clutch member is engaged by a shifting lever E fulcrumed at E' on the bracket A' and pivotally connected by a link $E^2$ with an arm $E^3$ secured on the front end of a shaft $E^4$ journaled in the front bracket A' and in a rear bracket $A^2$ erected on the main frame A. On the rear end of the shaft $E^4$ is secured a hand lever $E^5$ within reach of the operator seated on the seat $A^3$ supported on a cross bar $A^4$ connecting the bracket A' with the bracket $A^2$. The hand lever $E^5$ is adapted to be locked on a segment $E^6$, so as to hold the clutch member D' either in or out of engagement with the clutch member $C^3$.

On the left-hand end of the front shaft D is secured a bevel gear wheel F in mesh with a bevel gear wheel F' attached to the upper end of a vertically-disposed shaft $F^2$ journaled in suitable bearings arranged on the frame A and its bracket A', and on the lower end of the shaft $F^2$ is secured a crank disk $F^3$ connected by a pitman $F^4$ with one end of the cutter or sickle bar G mounted to slide in suitable bearings G' and operating in conjunction with the usual guard $G^2$ so as to cut the grain at the time the machine is drawn forward in the direction of the arrow $a'$. It is understood that the main frame A is provided with a suitable tongue $A^5$ and means for attaching draft animals so as to draw the machine over the field in the direction of the arrow $a'$.

The grain cut by the cutter bar G is acted on by the reel H so that the cut grain readily drops onto the platform I in the form of a slatted endless belt, which delivers the cut grain to the binder table J (see Figs. 6 and 7), adjustably mounted on the main frame A, and on which the grain is formed into bundles and the bundles tied by a binder, as hereinafter more fully described.

The binder table J is attached to the lower ends of brackets J', $J^2$, secured at their upper ends to rods $J^3$, $J^4$ mounted to slide in the brackets A', $A^2$ of the main frame A. The rod $J^4$ is engaged by a hand lever $J^5$ (see Fig. 8) within convenient reach of the operator seated on the seat $A^3$ to permit the operator to shift the rod $J^4$ and with it the rod $J^3$ and the brackets J', $J^2$ forward or backward according to the position of the grain on the platform I so that the butt ends of the grain passing onto the binder table J are maintained in proper alinement to insure the formation of smooth sheaves. The hand lever $J^5$ is fulcrumed on a segment $J^6$ attached to the cross bar $A^4$ and the said lever $J^5$ is adapted to be locked on the said segment to hold the binder table J in the adjusted position.

The binder table J has its upper surface slightly below the level of the upper run of the platform belt I (see Fig. 7), so that the grain readily passes from the discharge end of the platform belt I onto the binder table J without first requiring elevating of the grain.

The reel H (see Figs. 1, 2 and 3) has its shaft H' journaled in the upper end of a link $H^2$ pivotally connected by a shaft $H^4$ with the upper end of a link $H^3$ fulcrumed loosely at its lower end on the shaft D. The links $H^2$ and $H^3$ are pivotally connected by rearwardly extending links K and K' with hand levers $K^2$, $K^3$, fulcrumed on and adapted to be locked on segments $K^4$, $K^5$ attached to the cross beam $A^4$, the said means serving to hold the hand levers and links $H^2$, $H^3$ in a desired position according to the nature of the grain to be harvested at the time. The hand levers $K^2$ and $K^3$ are within convenient reach of the operator seated on the seat $A^3$, to permit the operator to manipulate the said levers $K^2$ or $K^3$ to raise or lower the reel H or to swing the same forward or backward, as the case may be.

In order to rotate the reel H use is made of a gearing connecting the shaft D with the reel shaft H', that is, on the shaft D is secured a pinion L in mesh with a gear wheel L' held on the shaft $H^4$ carrying a pinion $L^2$ in mesh with a gear wheel $L^3$ secured on the reel shaft H'. Thus when the machine is in use and the shaft D is rotated, as previously explained, then a rotary motion is transmitted by the gearing described to the reel H. By arranging the pinions L, $L^2$ and gear wheels L', $L^3$ in the manner above set forth and shown in Fig. 3, it is evident that the pinions and gear wheels remain in mesh when changing the positions of the links $H^2$ and $H^3$ by the operator manipulating the hand levers $K^2$, $K^3$.

It is understood that by the arrangement described the reel H is rotated and at the same time it can be raised or lowered or swung forward or backward so as to change its position relative to the sickle bar G and the guard $G^2$, according to the height of the grain harvested at the time, that is, for short grain the reel H is lowered while for longer grain it is raised, and for tangled grain it is lowered and swung forward.

The endless platform belt I passes around rollers I', $I^2$, journaled on the main frame A, as indicated in Figs. 2 and 7, and on the shaft $I^3$ of the roller $I^2$ is secured a sprocket wheel $I^4$ around which passes a sprocket chain $I^5$ also passing around a sprocket wheel $I^6$ mounted on a stud $I^7$ held on a bracket $A^6$ attached to the bracket $A^2$ (see Fig. 6). On the sprocket wheel $I^6$ is secured a gear wheel $I^8$ in mesh with a wide gear wheel $I^9$ secured on a longitudinally-extending shaft N, journaled at its rear end in the bracket $J^2$ and having its forward end slidably coupled with a hollow shaft N' journaled in the front bracket A', and on the said shaft N' is secured a bevel gear wheel $N^2$ in mesh with a bevel gear wheel $N^3$ attached to the shaft D, so that when the machine is running and the shaft D is rotated, then a rotary motion is given to the shaft N by the bevel gear wheels $N^3$, $N^2$, and the rotary motion of the shaft N is transmitted by the gear wheels $I^9$ and $I^8$, the sprocket wheels $I^6$, $I^4$ and the chain $I^5$ to the roller $I^2$ to cause the platform belt I to travel in the direction of the arrow $b'$. It is understood that by the use of the wide gear wheel $I^9$, the latter remains in mesh with the gear wheel $I^8$ on shifting the binder table J, as previously explained.

Directly above the binder table J operate the packing arms O, O' for packing the grain against a trip arm P normally inclined upwardly and outwardly, as shown in Fig. 7, the trip arm being secured on a rock shaft P' journaled on the binder frame J and arranged parallel to the shaft $I^3$ of the platform roller $I^2$. The grain is packed against the trip arm P until sufficient grain has accumulated to form a sheaf, and then the sheaf is encircled by a curved needle Q for tying the twine R around the sheaf, the said needle Q operating in the usual manner in conjunction with a knotter wheel S to tie the twine around the sheaf. The twine R is contained in a twine box R' and passes through an opening in the top of the box to the needle Q, as hereinafter more fuly described.

The packing arms O and O' are mounted to swing alternately up and down and are fulcrumed on the bar $J^3$, and the said arms O and O' are provided with elongated slots $O^2$, $O^3$ (see Fig. 7), engaged by crank arms $O^4$, $O^5$ extending diametrically opposite each other and secured or formed on the shaft N. Thus when the machine is running and the shaft N is rotated, as previously explained, then the crank arms $O^4$, $O^5$ impart an up and down swinging motion to the packing arms O, O'.

The rock shaft P' of the trip arm P is provided at its rear end (see Figs. 6 and 8) with a gear wheel $P^2$ in mesh with a segmental gear wheel $P^3$ fulcrumed at $P^4$ on the bracket $J^2$, and the said segmental gear wheel $P^3$ is provided with a rigid extension arm $P^5$ and with a swing arm $P^6$ carrying a friction roller $P^7$ and pressed on by a spring $P^8$ coiled on a rod $P^9$, slidingly engaging the segmental gear wheel $P^3$. A nut $P^{10}$ screws on the rod $P^9$, and on the said nut rests the lower end of the spring $P^8$ pressing with its upper end against the arm $P^6$. By the arrangement described the tension of the spring $P^8$ can be adjusted to allow of tripping the arm P whenever a desired amount of grain has accumulated and presses against the said arm P. The extension arm $P^5$ is adapted to engage the free end of a lever T (see Figs. 5 and 6), fulcrumed at T' on a cam $T^2$ secured to a shaft $T^3$ journaled in the brackets J' and $J^2$. The lever T is pressed on by a spring $T^4$ held on the cam $T^2$, and on the lever T is fulcrumed a pawl $T^5$ adapted to engage a ratchet wheel U attached to or formed on the hub of a gear wheel U' mounted to rotate loosely on the shaft $T^3$ (see Figs. 4, 5 and 6). The gear wheel U' is in mesh with an intermediate gear wheel $U^2$ journaled on the bracket $J^2$ and which is in mesh with a pinion $U^3$ secured on the shaft N, previously referred to, so that when the machine is running a rotary motion is given by the pinion $U^3$ and gear wheel $U^2$ to the gear wheel U' and its ratchet wheel U in the direction of the arrow c', as shown in Fig. 5, and when the pawl $T^5$ is in engagement with the ratchet wheel U then the cam $T^2$ is caused to rotate with it whereby a rotary motion is given to the shaft $T^3$. The friction roller $P^7$ previously mentioned is in contact with the peripheral face of the cam $T^2$ to normally hold the segmental gear wheel $P^3$ in the position shown in Fig. 6, so that the trip arm P extends upwardly and outwardly, as indicated in Fig. 7. During the time the grain accumulates on the trip arm P the extension arm $P^5$ engages the lever T and holds the same in inactive position, with the pawl $T^5$ out of engagement with the ratchet wheel U, so that the latter rotates freely without rotating the cam $T^2$ and the shaft $T^3$. When a swinging motion is given to the arm P by the weight of the accumulated grain, the extension arm $P^5$ moves out of engagement with the lever T and the latter is caused to swing inward by its spring $T^4$ to engage the pawl $T^5$ with the ratchet wheel U to rotate the cam $T^2$ and with it the shaft $T^3$ to actuate the needle Q and the knotter wheel S, the latter being secured on the shaft $T^3$. The forward end of the shaft $T^3$ is provided with an arm Q' (see Figs. 1 and 8), connected by a link $Q^2$ with an arm $Q^3$ secured on one end of a crank shaft $Q^4$ journaled in the brackets J' and $J^2$, and carrying at its crank $Q^5$ the needle Q, as indicated in Figs. 1, 6 and 7. The crank $Q^5$ is preferably made hollow in its rear portion or is provided with guideways for the passage of the twine R extending from the butt end of the needle Q to the point thereof, the free end of the twine being engaged by the knotter wheel S in the usual manner to tie the knot.

When the machine is running and the several parts are in the position shown in Figs. 6 and 7, the shaft $T^3$ is at a standstill, and consequently the knotter wheel S and the needle Q are dormant, with the point of the needle Q below the binder platform J. The trip arm P extends upward and outwardly so that the grain pushed by the arms O, O' accumulates on the trip arm P, and when sufficient grain has accumulated to form a bundle, the weight of the grain presses the trip arm P slightly downward against the tension of the spring $P^8$ and in doing so the shaft P' is turned to cause the gear wheel $P^2$ to impart a turning motion to the segmental gear wheel $P^3$. When this takes place the free end of the arm $P^5$ moves out of engagement with the free end of the lever T, which latter by the action of its spring $T^4$ is swung inward to engage the pawl $T^5$ with the ratchet wheel U. When this takes place the ratchet wheel U carries the cam $T^2$ along and consequently the shaft $T^3$ is rotated to actuate the knotter wheel S and to swing the needle Q upward and around the grain at the arm P and with the aid of the knotter wheel S to tie the twine about the said grain with a view to forming a tied sheaf. At the time that the sheaf is tied the friction roller P⁷ reaches the narrow portion of the cam T² whereby the arm P may be swung downward into discharge position without any resistance from the spring P⁸ by the pressure of the grain against said arm, so as to allow the bundle to drop off the platform J onto the ground. The friction roller P⁷ finally returns to the concentric portion of the cam T² whereby the arm P⁶ is swung downward and the segmental gear wheel P³ is returned to normal position by the pressure of spring P⁸, as shown in Fig. 6, and the free end of the lever T now again comes in contact with the arm P⁵, whereby the lever T is swung outward against the tension of its spring T⁴ and the pawl T⁵ is disengaged from the ratchet wheel U, so that the rotation of the shaft T³ ceases at the time the knotter wheel S and the needle Q are back into normal position.

The brackets A' and A² are preferably arch-shaped and the rear beam of the main frame A is cut off under the arch of the rear bracket A², so that a clear space is left adjacent to the outer side edge of the binder table for the discharge of the tied sheaf onto the ground, and without danger of the rear beam of the frame A passing over and crushing the sheaf.

The operation is as follows: When the machine is drawn forward over the field, a rotary motion is given to the shaft D from the traction wheel B to cause the sickle bar G to reciprocate and to rotate the reel H and to drive the shaft N for imparting a traveling motion to the platform belt I, so that the grain cut by the sickle bar G is caused to fall onto the platform belt I, which latter carries the grain sidewise in the direction of the arrow b', the grain finally passing from the inner end of the platform belt I onto the binder table J. The shaft N imparts an up and down swinging motion to the packing arms O and O', so that the grain on the binder table J is pressed against the trip arm P, and when a sufficient amount of grain has accumulated to form a sheaf then the weight of the said grain presses the trip arm P slightly downward so that a swinging motion is given to the segmental gear wheel P³ in mesh with the gear wheel P² secured on the shaft P' carrying the trip arm P. The swinging motion given to the segmental gear wheel P³ causes the arm P⁵ to swing out of engagement with the free end of the lever T so that the latter is released and swings inward by the action of its spring T⁴ to engage the pawl T⁵ with the ratchet wheel U. When this takes place the cam T² is rotated through the ratchet wheel U and consequently the shaft T³ is rotated to actuate the needle Q and the knotter wheel S for tying the twine R around the grain to form the sheaf, and as soon as this has been accomplished the friction roller P⁷ traveling on the incline of the cam T² allows the segmental gear wheel P³ to swing from the right to the left so that the arm P is allowed to swing downward and the tied sheaf is now discharged from the binder table J and drops over the side edge of the said binder table to the ground. When the friction roller P⁷ reaches the concentric portion of the cam T² then the segmental arm P³ is returned to its normal position shown in Fig. 6, whereby the trip arm P is raised to the normal position shown in Fig. 7 and the arm P⁵ reëngages the free end of the lever T to swing the same outward and thereby lift the pawl T⁵ out of engagement with the ratchet wheel U to stop further rotation of the shaft T³. When this takes place the knotter wheel S comes to a standstill and likewise the needle Q which is now again in its lowermost dormant position as shown in Fig. 7. As the grain again accumulates on the table J and is pushed by the packing arms O and O' against the trip arm P, the above described operation is repeated as soon as a sufficient amount of grain has accumulated on the said arm P according to the tension given to the spring P⁸ by adjusting the nut P¹⁰ correspondingly on the rod P⁹.

It is understood that the trip arm P remains in the up position during about the first one-fourth revolution of the shaft T³ and the knotter wheel S, after which it swings downward into the slot J⁷ below the surface of the binder table J. During the first fourth revolution of the shaft T³ the needle Q swings upward from its normal dormant position so that the point of the needle Q reaches the knotter wheel S, and the needle Q remains stationary in this up position during the next half revolution of the shaft T³, and during the last quarter of a revolution of the shaft T³ the needle Q swings downward back to its normal dormant position. While the needle Q is in the upper position on reaching the knotter wheel S, and as soon as the trip arm P is in lowermost position after tying the sheaf the latter can readily drop over the outer side edge of the binder table J to the ground.

It is understood that the means employed for tying the knot by the needle Q and the knotter wheel S are the same as now generally employed on machines of this kind and consequently it is not deemed necessary to describe or show the said knotting means in detail.

By constructing the harvester and binder in the manner described, its weight is considerably reduced so that the machine can be readily drawn over the field by two horses, and the machine owing to its lightness can be used on soft ground.

By adjusting the reel H relative to the cutting mechanism and the conveyer platform I, it is permissible to harvest long, short or tangled grain, and by arranging the conveyer platform I and the binder table approximately on the same plane all elevating means for the grain are dispensed with.

By having the binder table J adjustable transversely relative to the direction of the travel of the conveyer platform I, the grain can be readily alined at the butt ends on passing from the discharge end of the platform I onto the said binder table, and hence smooth, neat and uniform sheaves are discharged from the machine. By curving the needle Q, swinging the same up and down, and arranging the needle Q relative to the binder table J, the arm P and the knotter wheel S, as shown in Fig. 7, it is possible to keep the bar of the crank $Q^5$, which carries the needle, above the grain during the formation of a bundle of grain, and after the grain is tied the needle Q readily swings down to lowermost position into the slot of the binder table J, to allow a ready discharge of the sheaf over the outer edge of the binder table.

Having thus described my invention, I claim as new and desire to secure by Letters Patent:

1. A machine of the class described, provided with swinging packing arms, a trip arm against which the grain is packed by said packing arms, a binding device having a needle, a knotter wheel, an intermittently rotating shaft carrying the knotter wheel, a mechanism connecting the said shaft with the said needle, a controlling device having a member connected with said trip arm and provided with a rigid projection and a roller arm, a cam on the knotter wheel shaft and engaged by said roller arm, a driven member loose on said knotter shaft, and a tension member for engagement with said driven member and normally engaged and withheld by said projection on said controlling device.

2. A machine of the class described comprising a main frame carrying a driven shaft, a supplemental frame slidably mounted through certain of the members of said main frame and provided with a crank shaft having connection with said driven shaft, said supplemental frame embodying upper horizontal bars and a lower horizontal binder table, manually controlled means engaging one of said frame bars to adjust the supplemental frame with respect to the main frame, packing arms pivoted at one end upon the other bar and having intermediate connection with the said crank shaft, a movable trip arm adjacent the binder table and against which the grain is packed by said packing arms, a binding device embodying a needle, a knotter wheel, an intermittently rotating shaft for actuating the knotter wheel and needle, and having connections with said crank shaft embodying an idle member, a clutch for engagement with said idle member, and connections between said trip member and said clutch and normally holding the latter against operation.

3. A machine of the class described, provided with swinging packing arms, a trip arm having a rock shaft and against which the grain is packed by the said packing arms, a binding device having a needle, a knotter wheel, an intermittently-rotating shaft carrying the knotter wheel, a mechanism connecting the said shaft with the said needle, and a controlling device having a gear wheel on the said rock shaft, a segmental gear wheel in mesh with the said gear wheel and provided with a fixed arm and a spring-pressed roller arm, a cam secured on the said knotter wheel shaft and engaged by the said spring-pressed roller arm, a driven ratchet wheel loose on the said knotter wheel shaft, a spring-pressed lever mounted on the said cam and normally engaged by the fixed arm of the said segmental gear wheel, and a pawl on the said lever for engagement with the said ratchet wheel when the lever is released.

4. A machine of the class described, provided with swinging packing arms, a trip arm having a rock shaft and against which the grain is packed by the said packing arms, a binding device having a needle, a knotter wheel, an intermittently-rotating shaft carrying the knotter wheel, a mechanism connecting the said shaft with the said needle and a controlling device having a gear wheel on the said rock shaft, a segmental gear wheel in mesh with the said gear wheel and provided with a fixed arm and a spring-pressed roller arm, a cam secured on the said knotter wheel shaft and engaged by the said spring-pressed roller arm, a driven ratchet wheel loose on the said knotter wheel shaft, a spring-pressed lever mounted on the said cam and normally engaged by the fixed arm of the said segmental gear wheel, a pawl on the said lever for engagement with the said ratchet wheel when said lever is released, and means for adjusting the tension of the spring on the said spring-pressed roller arm.

5. A machine of the class described comprising a main frame carrying a driven shaft, a supplemental frame slidably mounted through certain of the members of said main frame and provided with a crank shaft having connection with said driven shaft, said supplemental frame embodying upper horizontal bars, and a lower horizontal binder table provided with a cut-out portion, manually controlled means engaging one of said bars to adjust the supplemental frame with respect to the main frame, packing arms pivoted at one end upon the other bar and having intermediate connection with the said crank shaft, a movable trip arm adjacent the binder table and against which the grain is packed by the said packing arms, a binding device having a needle, a knotter wheel, an intermittently rotating shaft carrying the knotter wheel, a mechanism connecting said shaft with said needle, a controlling device having a member connected with said trip arm and provided with a rigid projection and a roller arm, a cam on the knotter wheel shaft and engaged by said roller arm, a driven member loose on said knotter shaft, and a tension member for engagement with said driven member and normally engaged and withheld by said projection on said controlling device.

6. A machine of the class described, provided with swinging packing arms, a binder table having a cut-out portion, a trip arm against which the grain is packed by said packing arms, a binding device embodying a curved needle normally at rest in the said cut-out portion of said binder table, an intermittently rotating shaft having a crank on which the said needle is fastened, the said crank being hollow so as to form, of itself, means for guiding the twine to the needle, a controlling device having a member connected with said trip arm and provided with a rigid projection and a roller arm, a knotter wheel carried by said intermittently rotating shaft, a cam on the knotter wheel shaft and engaged by said roller arm, a driven member loose on said knotter shaft, and a tension member for engagement with said driven member and normally engaged and withheld by said projection on said controlling device.

In testimony whereof I have signed my name to this specification in the presence of two subscribing witnesses.

ATHOL LINNWOOD POWELL.

Witnesses:
DAVID H. POWELL,
CLAUDE L. POWELL.

Copies of this patent may be obtained for five cents each, by addressing the "Commissioner of Patents, Washington, D. C."